(12) United States Patent
Winkel et al.

(10) Patent No.: US 10,216,516 B2
(45) Date of Patent: Feb. 26, 2019

(54) FUSED ADJACENT MEMORY STORES

(71) Applicant: Intel Corporation, Santa Clara, CA (US)

(72) Inventors: Sebastian Winkel, Los Altos, CA (US); Jamison D. Collins, San Jose, CA (US); Tyler Sondag, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 15/281,957

(22) Filed: Sep. 30, 2016

(65) Prior Publication Data

US 2018/0095761 A1 Apr. 5, 2018

(51) Int. Cl.
| | | |
|---|---|---|
| *G06F 9/312* | (2018.01) | |
| *G06F 9/34* | (2018.01) | |
| *G06F 3/00* | (2006.01) | |
| *G06F 9/30* | (2018.01) | |
| *G06F 3/06* | (2006.01) | |
| *G06F 9/38* | (2018.01) | |

(52) U.S. Cl.
CPC ........ *G06F 9/30043* (2013.01); *G06F 3/0608* (2013.01); *G06F 3/0625* (2013.01); *G06F 3/0644* (2013.01); *G06F 3/0659* (2013.01); *G06F 3/0673* (2013.01); *G06F 9/3017* (2013.01); *G06F 9/3004* (2013.01); *G06F 9/30072* (2013.01); *G06F 9/30145* (2013.01); *G06F 9/30181* (2013.01); *G06F 9/30185* (2013.01); *G06F 9/382* (2013.01); *G06F 9/3812* (2013.01)

(58) Field of Classification Search
CPC ............ G06F 9/30181; G06F 9/30185; G06F 9/3853; G06F 9/3004; G06F 9/30043; G06F 9/382; G06F 9/3812; G06F 9/30072; G06F 9/3017; G06F 9/30145; G06F 3/0608; G06F 3/30625; G06F 3/30644; G06F 3/0659; G06F 3/0673
USPC ........................................ 712/213, 226, 245
See application file for complete search history.

(56) References Cited

U.S. PATENT DOCUMENTS

| | | | | |
|---|---|---|---|---|
| 5,721,855 | A  * | 2/1998 | Hinton ................ | G06F 9/30152 |
| | | | | 711/E12.049 |
| 8,090,931 | B2 * | 1/2012 | Col ..................... | G06F 9/30043 |
| | | | | 712/218 |
| 2003/0033491 | A1* | 2/2003 | Henry ................. | G06F 9/30043 |
| | | | | 711/154 |

* cited by examiner

*Primary Examiner* — Daniel H Pan
(74) *Attorney, Agent, or Firm* — Lowenstein Sandler LLP

(57) ABSTRACT

A processing device includes a store instruction identification unit to identify a pair of store instructions among a plurality of instructions in an instruction queue. The pair of store instructions include a first store instruction and a second store instruction. The first data of the first store instruction corresponds to a first memory region adjacent to a second memory region, and a second data of the second store instruction corresponds to the second memory region. The processing device to include a store instruction fusion unit to fuse the first store instruction with the second store instruction resulting in a fused store instruction.

24 Claims, 14 Drawing Sheets

FUSED ADJACENT MEMORY STORES

TECHNICAL FIELD

The implementations of the disclosure relate generally to computer systems, and more specifically, but without limitation, to fused adjacent memory stores.

BACKGROUND

Modern processors are designed to perform optimizations on a plurality of instructions. One such optimization is fusion, which involves combining multiple instructions into a single instruction. One such instruction is a store instruction, which includes storage of data into portions of memory.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for fused adjacent memory stores. In typical high-performance modern processors, one performance optimization involves a fusion technique, which combines multiple instructions into a single instruction, thus reducing the number of overall instructions. This type of optimization results in fewer instructions that need to be fetched, executed, retired, etc. One such instruction is a store instruction, which includes storage of data into portions of memory.

Conventional systems do not provide for fusion of store instructions to adjacent memory locations. The conventional systems are lacking in instruction set architecture (ISA) support and/or do not provide the underlying hardware to handle such a fusion case. As a result, conventional system are inefficient in terms of processor and/or computer system performance, including insufficient reduction in instructions, more memory consumption, slow processing speed, and high power consumption.

Implementations of the disclosure alleviate the above-noted and other deficiencies by fusing a pair of store instructions, where each store instruction stores data in adjacent memory regions. In one implementation, a pair of store instructions among a plurality of instructions in an instruction queue are identified. The pair of store instructions include a first store instruction and a second store instruction. A first data of the first store instruction corresponds to a first memory region adjacent to a second memory region, and a second data of the second store instruction corresponds to the second memory region. In one implementation, the first store instruction and the second store instruction are merged into a single fused store instruction. The single fused store instruction includes the first data and the second data and identification of the first memory region on which the first data is be stored. The single fused store instruction causes the first data to be stored in the first memory region followed by storage of the second data into the second memory region.

Implementations of the disclosure overcome the disadvantages of conventional systems by reducing the number of instructions in an instruction set due to the fusion of store instructions. This reduction in instructions correspondingly provides improved processor performance including faster processing speed, less memory consumption and improved power consumption.

Figure 1:
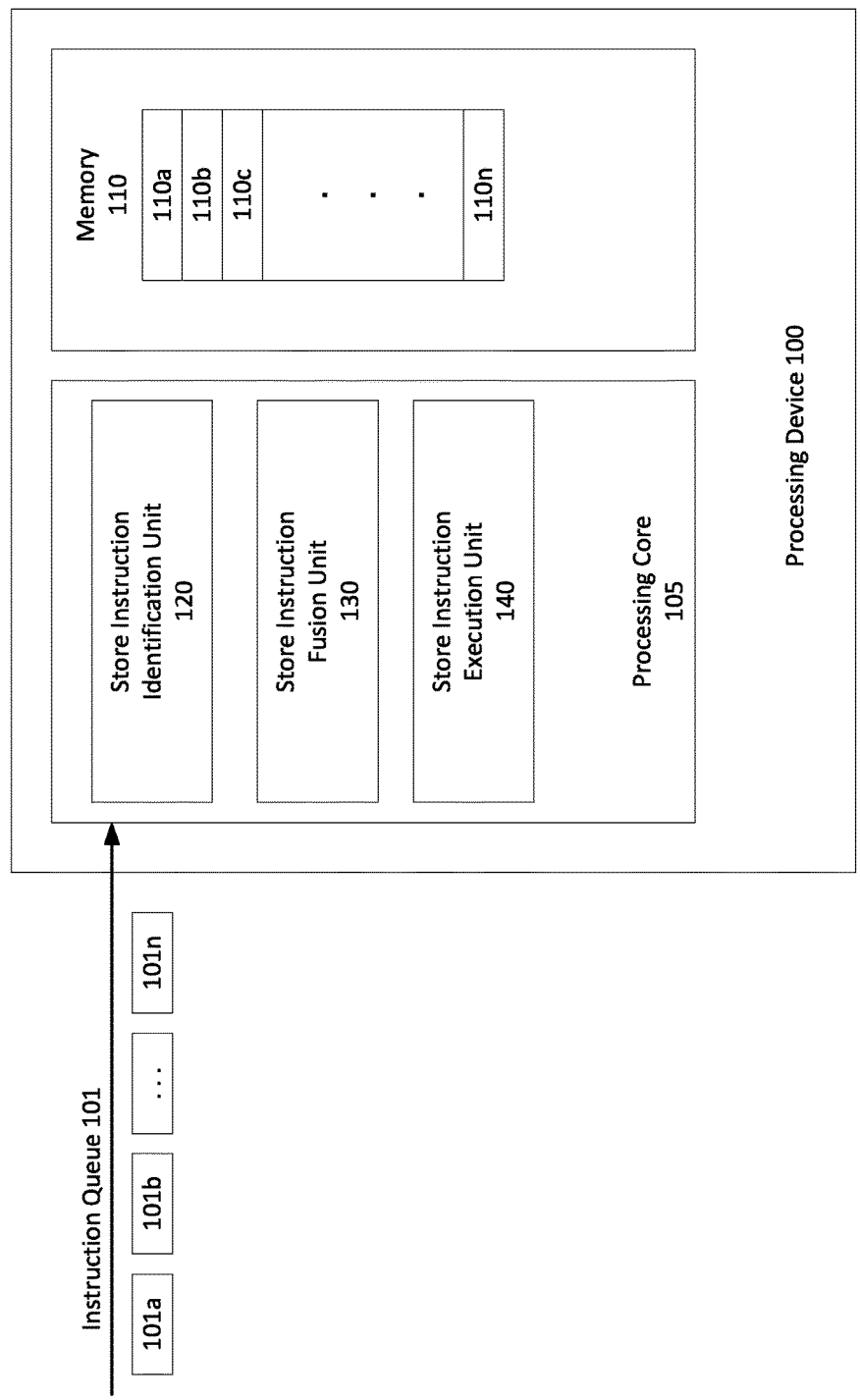
FIG. 1 illustrates a block diagram of a processing device implementing fused adjacent memory stores according to an implementation of the disclosure.

FIG. 1 is a block diagram illustrating a processing device 100 that fuses adjacent memory stores, according to one implementation. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor, which is typically capable of processing a single instruction pipeline, or a multi-core processor, which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one implementation, processing device 100 may include one or more processing cores 105, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another implementation, the processing device 100 may be used in a system on a chip (SoC) system.

The processing core 105 may execute instructions of the processing device 100. The processing core 105 includes, but is not limited to, pre-fetch logic to fetch instructions, decode logic to decode the instructions, execution logic to execute instructions and the like. The processing core 105 includes a cache (not shown) to cache instructions and/or data. The cache includes, but is not limited to, a level one, level two, and a last level cache (LLC), or any other configuration of the cache memory within the processing device 100. The processing core 105 may be used with a computing system on a single integrated circuit (IC) chip of a computing system. One implementation of a computing system on a chip may comprise a processor and a memory. The memory for one such system is a flash memory. The flash memory can be located on the same die as the processor and other system components. Additionally, other logic blocks such as a memory controller or graphics controller can also be located on a system on a chip. The instructions may include, but are not limited to, pre-fetch logic to fetch instructions, decode logic to decode the instructions, execution logic to execute instructions and the like.

In one implementation, the processing core 105 receives an instruction queue 101 that includes a plurality of instructions 101a-101n that are to be executed by the processing core 105 after being decoded into upop by decoders (not shown). The processing device 100 includes a memory 110 having a plurality of memory regions 110a-110n for storing data to access for executing the plurality of instructions 101a-101n by the application 150. In one implementation, the memory regions 110a-110n are caches.

In one implementation, the processing core 105 may include a store instruction identification unit 120, a store instruction fusion unit 130, and a store instruction execution unit 140. Units 120-140 may include circuitry and/or processing logic to perform fused adjacent memory stores according to implementations of the disclosure. In some implementations, units 120-140 may be part of circuitry and/or logic of the processing core 105 that was described above, such as pre-fetch logic, decode logic, and/or execution logic. In other implementations, units 120-140 may be separate circuitry and/or logic of the processing core 105.

In one implementation, the processing core 105 include a store instruction identification unit 120 that monitors the instruction queue 101 to identify one or more pairs of store instructions (among the plurality of instructions 101a-101n) that are candidates for fusion. The candidate pair(s) of one or more pairs of store instructions store data in memory regions (among the plurality of memory regions 101a-101n) that are adjacent to each other In one example, the candidate pair(s) of one or more pairs of store instructions that are close to each other within a region of 10-20 instructions. In one implementation, the store instruction identification unit 120 identifies pairs of store instructions from those instructions among the plurality of instructions 101a-101n that are adjacent to each other. In one example, the candidate pair(s) are adjacent to each other by being directly next to each other.

In one implementation, the store instruction identification unit 120 analyzes first and second operands in each pair of store instructions to determine whether a store instruction in the pair is to store data in a memory region (among the plurality of memory regions 110a-110n) that is adjacent to (e.g., directly next to) another memory region (among the plurality of memory regions 110a-110n) into which the other store instruction in the pair is to store data. The first operand may correspond to a memory region among the plurality of memory regions 110a-110n. The second operand may define a data element of a specific width (i.e. bits), the contents of which are to be stored in the memory region specified by the first operand In one implementation, the store instruction identification unit 120 may identify a pair of store instructions from the instruction queue 101 that are candidates for fusion, per the above description. The pair of instructions may include a first store instruction and a second store instruction, The first operand in the first store instruction may correspond to a first memory region among the plurality of memory regions 110a-110n and the second operand of the first store instruction specifies a first data element of a first width, the contents of which are to be stored in the first memory region specified by the first operand. In one implementation, the first operand in the second store instruction may correspond to a second memory region among the plurality of memory regions 110a-110n and the second operand of the second store instructions specifies a second data element of a second width, the contents of which are to be stored in the second memory region. In one implementation, the first and the second memory regions are adjacent to one another (e.g. directly next to one another). In one implementation, the first width is the same as the second width. For example, both the first and the second widths are each 32 bits. In one implementation, the first width is different than the second width. For example, the first width is 64 bits and the second width is 32 bits.

In one implementation, the processing device 100 includes a store instruction fusion unit 130 that fuses (i.e., merges) the identified pair of store instructions (that store data in adjacent memory regions) into a fused store instruction. In one implementation, the single fused store instruction specifies a larger portion of the memory region compared to a portion of the memory region specified in each of the pair of instructions.

In one implementation, the single fused store instruction generated by the store instruction fusion unit 130 includes three operands: a first operand, a second operand, and a third operand. The first operand may be the same as the first operand of each of the pair of the store instructions. As discussed above, the first operand corresponds to a portion of a memory region among the plurality of memory regions 110a-110n. The second operand may be same as the second operand of each of the pair of the store instructions. In one implementation, the second operand specifies the first data element, the contents of which are to be stored beginning at an initial data storage location of the memory region. In one implementation, the third operand specifies the second data element, the contents of which are to be stored in another memory region adjacent to memory region. In one implementation, the combination of the first and the second data elements is referred to as a fused data element. As the single fused store instruction stores more data (i.e., the contents of both of the first data element and the second data element) compared to contents stored in each of the individual store instructions in the pair of store instructions, the single fused store instruction modifies a larger portion of the memory region compared to the memory regions in each of the individual store instructions of the pair of store instructions.

In one implementation, the processing device 100 includes a store instruction execution unit 140 that executes the single fused store instruction. In one implementation, the store instruction execution unit 140 stores the content of the first data element and the second data element in the memory regions 110a-110n based on the single fused store instruction. In one implementation, the store instruction execution unit 140 analyzes the first, second and third operands of the single fused store instruction to store the contents of the first data element and the second data element.

In one implementation, the store instruction fusion unit 130 fuses the first store instruction and the second store instruction into the single fused store instruction in an ascending storage order. With respect to the implementation of the ascending storage order, the first store instruction in the pair of store instructions should occur before the second store instruction in the pair of store instructions among the plurality of instructions 101a-101n in the instruction queue 101. In addition, a first memory region is adjacent to a second memory region and the second memory region is located after the first memory region, such that the contents of the first or the second data elements are stored in the first memory region prior to being stored in the second memory region. In one implementation, the first operand of the first store instruction corresponds to a first initial data storage of the first memory region into which to begin storage of content the first data element. Furthermore, the first operand of the second store instruction corresponds to a second initial data storage location of the second memory region onto which to begin storage of content of the second data element. As the second memory region is located after the first memory region in the ascending order implementation, the second initial data storage location of the second memory region is located after the first initial data storage location of the first memory region. The store instruction fusion unit 130 fuses the first store instruction and the second store instruction into the single fused store instruction in an ascending storage order such that contents of the first data element is stored in the first memory region, followed by contents of the second data element stored in the second memory region.

As discussed above, the single fused store instruction includes the first operand, the second operand, and the third operand. In the ascending storage order implementation, the first operand may correspond to the first initial data storage location of the first memory region. The second operand may specify the first data element contents that are to be stored at the first initial data storage location of the first memory region. The third operand may specify the second data element contents that are to be stored at the second initial data storage location of the second memory region, which is adjacent to the first memory region. In one implementation, a first memory region includes a first final data storage location such that the storage of the first data element contents are completed in the first final data storage location In one implementation, a second memory region includes a second final data storage location such storage of the second data element contents are completed in the second final data storage location.

In the ascending storage order implementations, the contents of the first data element may utilize more storage area than is provided in the first memory region. In such an implementation, the first width of the first data element exceeds the width of the first memory region. As such, a portion of the content of the first data element may cross over from the first memory region to the second memory region for storage purposes. In one implementation, store instruction execution unit 140 stores the portion of the content of the first data element beginning from the second initial data storage location of the second memory region.

In the ascending storage order implementation, the content of the second data element may utilize more storage area than is provided in the second memory region. In such an implementation, the second width of the second data element exceeds the width of the second memory region. As such, a portion of the content of the second data element may cross over from the second memory region to the first memory region to be stored in the first memory region. In one implementation, the store instruction execution unit 140 stores the portion of content of the second data element beginning from the first initial data storage location of the first memory region.

Figure 2A:
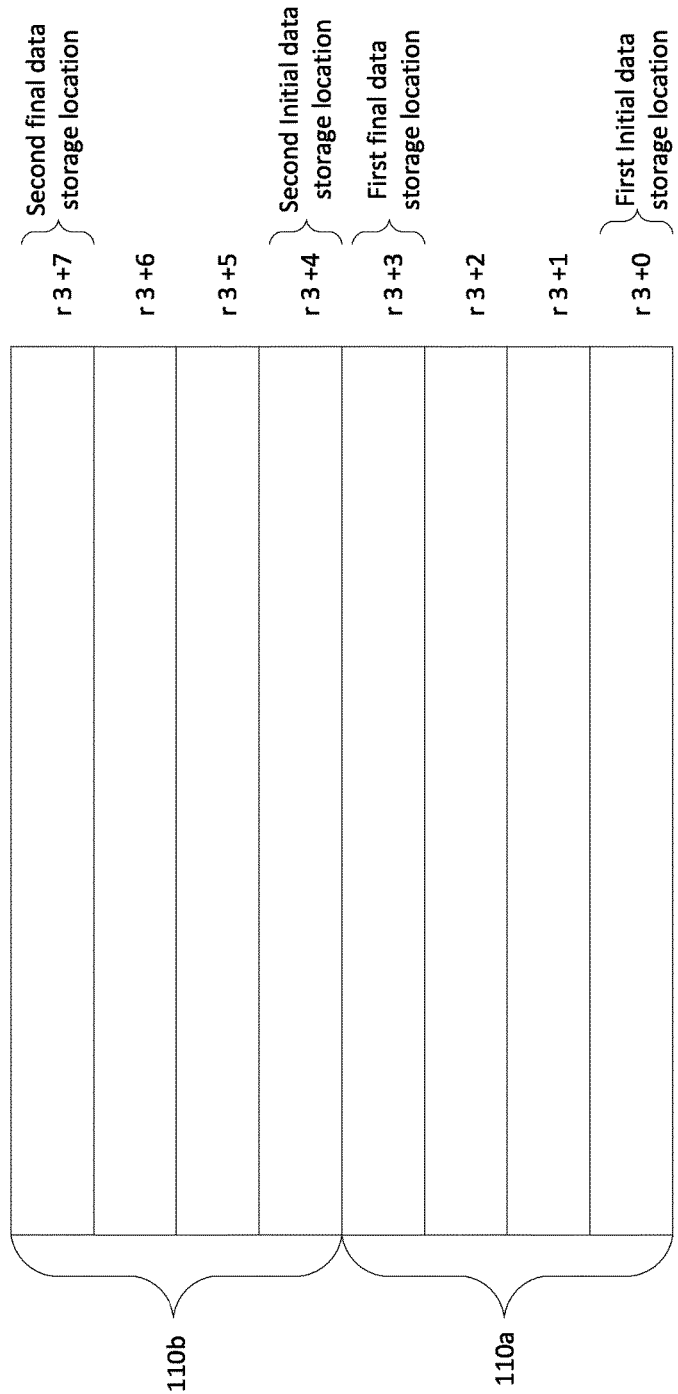
FIG. 2A illustrates an example of two adjacent memory stores according to an implementation of the disclosure.

Referring to FIG. 2A, an example is provided of two adjacent memory regions, a first memory region 110a and a second memory region 110b. The first and second memory regions 110a, 110b are adjacent to one another (e.g., directly next to each other). In this example, the first memory region 110a includes a first initial data storage location [r3+0] and a first final data storage location [r3+3]. The second memory region 110b includes a second initial data storage location [r3+4] and a second final data storage location [r3+7]. Contents of data elements to be stored to the first memory region 110a and the second memory region 110b may be written beginning from the location [r3+0] through location [r3+7]. In this example shown in FIG. 2A, each of the first and second memory regions 110a and 110b, respectively, have a 32-bit width and each of the locations [r3+0] to [r3+7] store 4 bytes of data.

Figure 2B:
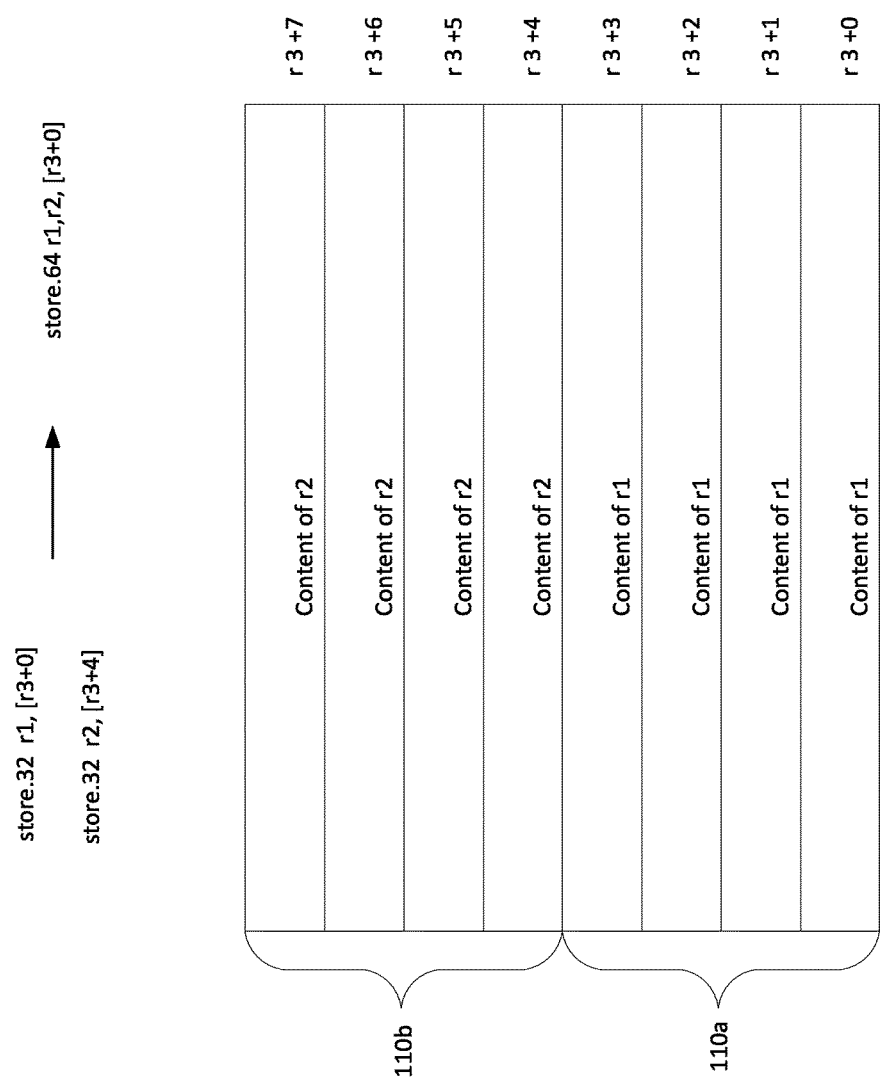
FIG. 2B illustrates an example of fusing two adjacent memory stores in ascending order according to an implementation of the disclosure.

Referring to FIG. 2B, there is shown an example of fusing two store instructions, such that a first store instruction stores content of a first data element of 32 bit width and a second store instruction stores content of a second data elements of 32 bit width in ascending storage order, resulting in a single fused store instruction in an ascending storage order. FIG. 2A depicts the first and the second memory regions 110a and 110b respectively of FIG. 2A. As discussed above with respect to FIG. 2A, contents of first and second data elements may be stored in the first and the second memory regions 110a and 110b, respectively.

In the example shown in FIG. 2B, store.32 r1, [r3+0] is a first store instruction to cause 32 bits of a first data element, r1, to be stored to a first initial data storage location, [r3+0]. The store.32 r2, [r3+4] is a second store instruction to cause 32 bits of a second data element, r2, to be stored to a second initial data storage location, [r3+4]. Also, as shown in FIG. 2B, [r3+3] is the first final data storage location for r1 and [r3+7] is the second final data storage location for r2. The first store instruction, store.32 r1, [r3+0], and the second store instruction, store.32 r2, [r3+4], are identified as candidates for fusion according to implementations of the disclosure. The first and second store instructions may be fused into a fused store instruction, store.64 r1, r2 [r3+0] as shown. The fused store instruction causes contents of data elements r1 and r2 to be stored in ascending storage order with contents of r1 being stored starting at data storage location [r3+0] followed by storing of contents of r2 and ending at data storage location [r3+7].

As such, the single fused store instruction store.64 r1,r2 [r3+0] is a 64-bit store instruction in ascending storage order, where contents of the first data element r1 are stored beginning at the first initial data storage location [r3+0], followed by storage of contents of the second data element r2. Any previous content stored at each of the locations [r3+0] through [r3+3] is overwritten with contents of the first data element r1. As the first store instruction is a 32-bit store instruction, 4 bytes of content are written at each of the addresses. Any previous content stored at each of the locations [r3+4] through [r3+7] is overwritten with contents of the second data element r1. As the second store instruction is also a 32-bit store instruction, 4 bytes of content is written at each of the addresses.

The above example describes an ascending storage order of a first store instruction of 32 bits (width of the first data element r1) and a second store instruction of 32 bits (width of the second data element r2) merged together in a fused store instruction of 64 bits (width of the combined first data element r1 and the second data element r2). Implementations of the disclosure may also be utilized for a first store instruction that is less than or greater than 32 bits and a second store instruction that is less than or greater than 32 bits. For example, the first store instruction may be 48 bits and the second store instruction may be 16 bits. In this example, the content of the first data element r1 crosses over from the first final data storage location [r3+3] to the second initial data storage location [r3+4]. When storing the data element of the first store instruction, the store instruction execution unit 140 can, once it has crossed over to the second memory region 110b (upon storing the first 32 bits in the first memory region 110a) store 8 bytes of data in the second initial data storage location [r3+4], followed by storing another 8 bytes of data in the location [r3+5]. The store instruction execution unit 140 may then store the data of the second data element r2 beginning in the data storage location of [r3+6] through [r3+7].

In another example, the first store instruction is 16 bits and the second store instruction is 48 bits. In this example, the store instruction execution unit 140 may begin storing the content of the first data element r1 in the first initial data storage location [r3+0] followed by storing the content of the first data element r1 in the location [r3+1], and then store content of the second data element r2 from the location [r3+2] through the second final data storage location [r3+7].

As discussed above, the first store instruction in the pair of store instructions may occur before the second store instruction in the pair of store instructions among the plurality of instructions 101a-101n in the instruction queue 101 of FIG. 1. Also, as discussed above, the first memory region and the second memory region are adjacent to each other. Also as discussed above, the second memory region may be located after the first memory region such that the content of the first or the second data elements are stored in the first memory region prior to being stored in the second memory region.

However, in some implementations, the first operand of the first store instruction corresponds to the second memory region and the first operand of the second store instruction corresponds to the first memory region. As such, the first and the second store instructions define storing contents of data of the corresponding first and data elements in descending (reverse) storage order. In descending storage order, content of the second data element is to be stored in the first memory region, followed by the contents of the first data element to be stored in the second memory region. As discussed above, the store instruction fusion unit 130 fuses the first store instruction and the second store instruction into the single fused store instruction. In one implementation, the store instruction fusion unit 130 marks the single fused store instruction with a descending storage order designator to cause the store instruction execution unit 140 to execute the stored fusion instruction in a descending storage order.

Figure 2C:
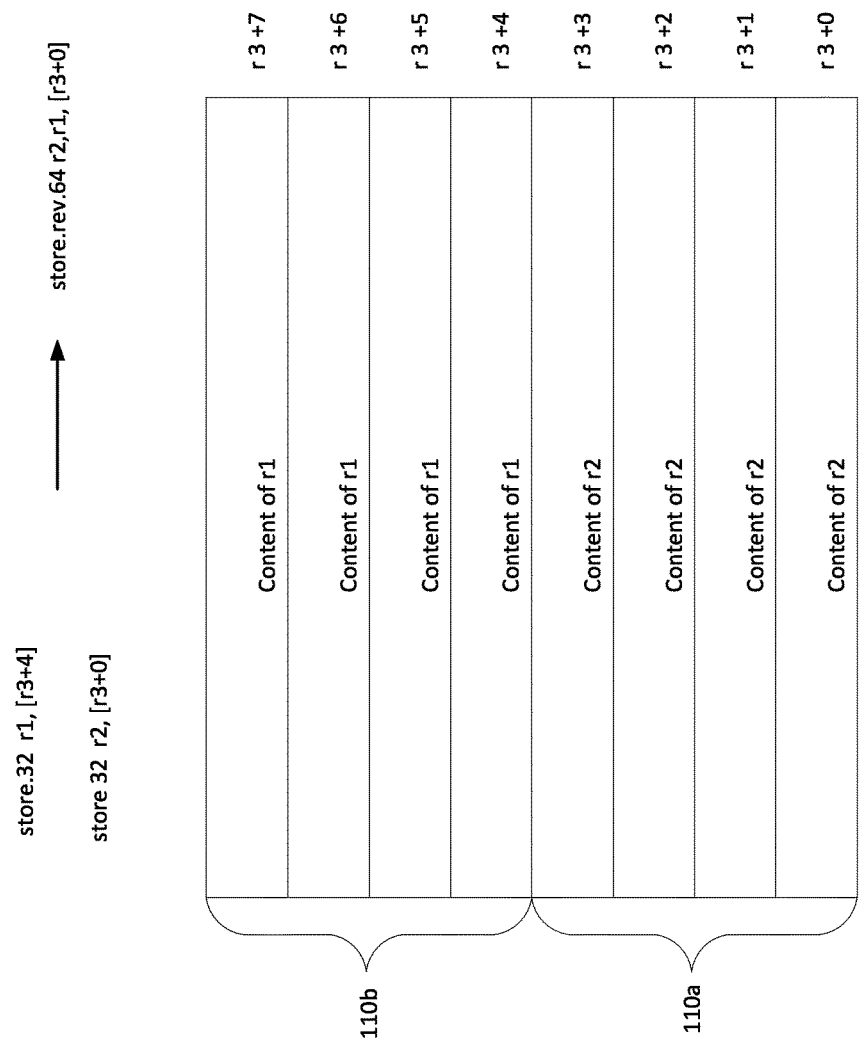
FIG. 2C illustrates an example of fusing two adjacent memory stores in descending order according to an implementation of the disclosure.

Referring to FIG. 2C, an example is illustrated of fusing two store instructions, such that a first store instruction stores content of a first data element of 32 bit width and a second store instruction stores content of a second data element of a 32-bit width memory in descending storage order, resulting in a single fused store instruction in a descending storage order. FIG. 2C depicts the first and the second memory regions, 110a and 110b, respectively, of FIG. 2A. As discussed above with respect to FIG. 2A, contents of first and second data elements may be stored in the first and the second memory regions 110a and 110b, respectively.

In the example shown in FIG. 2C, store.32 r1, [r3+4] is a first store instruction to cause 32 bits of a first data element r1, to be stored to the second initial data storage location, [r3+4]. The store 32 r2, [r3+0] is a second instruction to cause 32 bits of a second data element r2 to be stored to the first initial data storage location [r3+0]. The first store instruction, store.32 r1, [r3+4], and the second store instruction, store.32 r2, [r3+0], are identified as candidates for fusion according to implementations of the disclosure. The first and second store instructions may be fused into a fused store instruction, 64.rev. r2,r1 [r3+0] as shown. The fused store instruction causes contents of data elements r1 and r2 to be stored in descending storage order marked by "rev" with contents of r2 being stored starting at data storage location [r3+0], followed by storing of contents of r1 and ending at data storage location [r3+7].

As such, the single fused store instruction store.64.rev. r2,r1 [r3+0] is a 64-bit store instruction in descending storage order where the contents of the second data element r2 are stored beginning at the first initial data storage location [r3+0], followed by storage of contents of the first data element r1. Any previous content stored at each of the locations [r3+0] through [r3+3] is overwritten with contents of the second data element r2. Any previous content stored at each of the locations [r3+4] through [r3+7] is overwritten with contents of the first data element r1. As the second store instruction is also a 32-bit store instruction, 4 bytes of content is written at each of the addresses.

In one implementation, in the descending storage order, the content of the second data element may utilize more storage area than provided in the first memory region. In one implementation, the second width of the second data element exceeds the width of the first memory region. As such, the content of the second data element may cross over from the first memory region to the second memory region to store the remaining content of the second data element in the second memory region. Similarly, in another implementation, the content of the first data element may utilize more storage area than provided in the second memory region. In one implementation, the first width of the first data element exceeds the width of the second memory region. As such, the content of the first data element may cross over from the second memory region to the first memory region to store the remaining content of the first data element into the first memory region. In one implementation, when either of the above situations occurs, the store instruction fusion unit 130 generates a fault. In another implementation, when either of the above situations occurs, the store instruction fusion unit 130 causes roll-back to a program point prior to either of the two instructions that were fused to crease a faulting instruction. In a further implementation, when either of the above situations occurs, the store instruction fusion unit 130 causes execution to return to the original instruction order prior to fusion. The store instruction execution unit 140 resumes execution without performing fusion. In some implementations, the store instruction execution unit 140 executes a version of the code where the fusion has not been performed.

Figure 3:
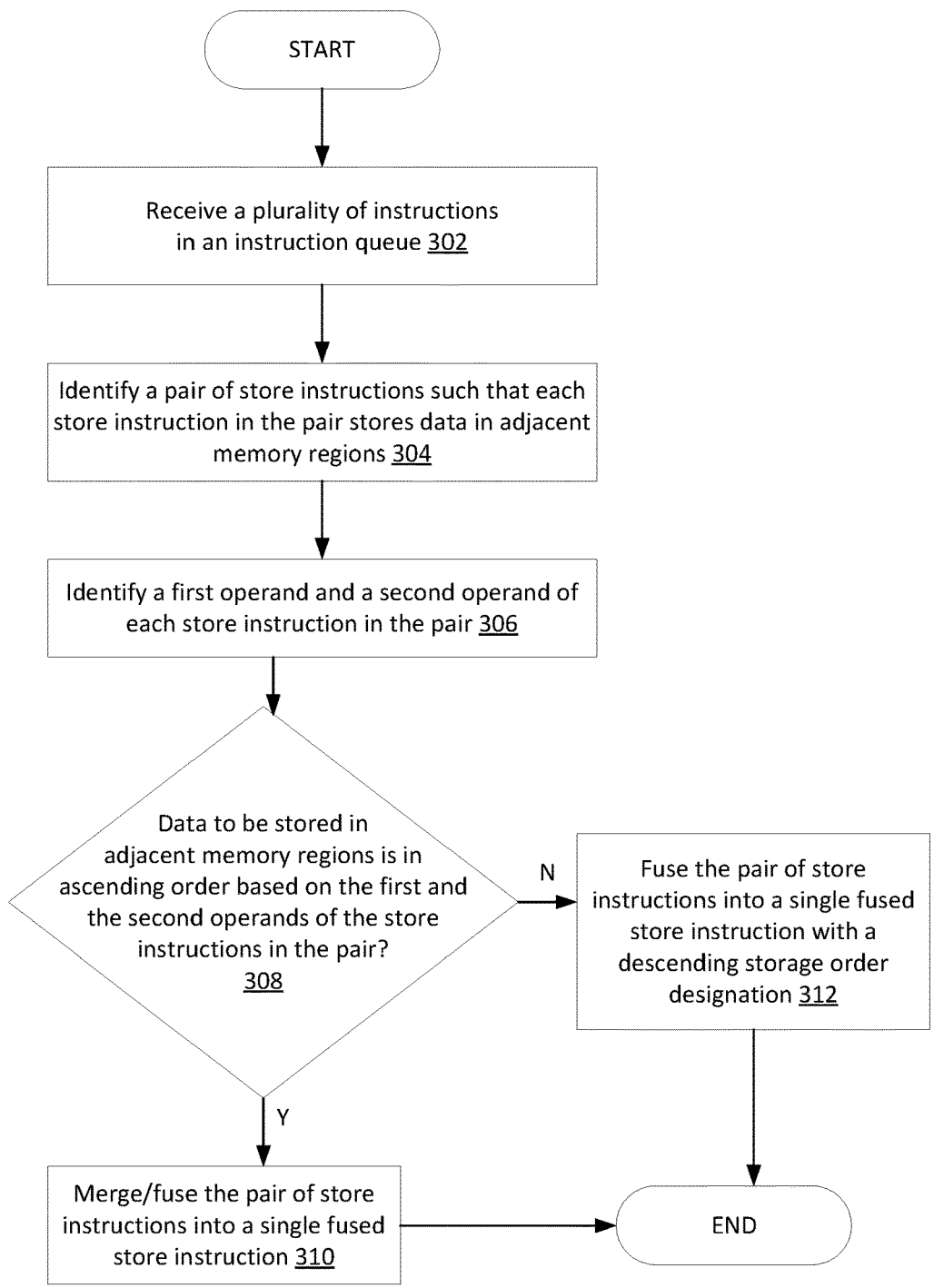
FIG. 3 illustrates a flow diagram of a method for fusing adjacent memory stores according to an implementation of the disclosure.

FIG. 3 is a flow diagram of a method 300 for fusing adjacent memory stores in a processing device according to an embodiment of the disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed, in part, by the store instruction identification unit 120 and the store instruction fusion unit 130 as described above with respect to FIGS. 1 and 2.

For simplicity of explanation, method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

At block 302, processing logic receives a plurality of instructions in an instruction queue. In one implementation, the instructions arrive in an instruction order to the instruction queue. At block 304, the processing device identifies a pair of store instructions such that each store instruction of the pair stores data in adjacent memory regions. As discussed above, in one implementation, the pair of store instructions include a first store instruction and a second store instruction, where a first data element of the first store instruction corresponds to a first memory region adjacent to a second memory region, and where the second data element of the second instruction corresponds to the second memory region. As discussed above, the first instruction occurs prior to the second instruction in the instruction queue. Also, as discussed above, a first memory region is adjacent to a second memory region and the second memory region is located after the first memory region, such that the contents of the first or the second data elements are stored in the first memory region prior to being stored in the second memory region.

At block 306, the processing device identifies a first operand and a second operand of each store instruction in the pair. As discussed above, the first operand specifies a memory region and the second operand specifies a data element, the content of which are to be stored in the specified memory region. At block 308, the processing device determines whether the data to be stored in adjacent memory regions is in ascending order based on the first operand and the second operand of each of store instructions in the pair. In one implementation, it is determined that the data is to be stored in the ascending order when the first operand of the first store instruction corresponds to the first memory region and the second operand of the first store instruction specifies the first data to be stored in the first memory region, and when the first operand of the second store instruction corresponds to the second memory region and the second operand of the second store instruction specifies the second data to be stored in the second memory region. At block 310, the processing device fuses the pair of store instructions into a single fused store instruction. In one implementation, the single fused store instruction includes a first operand of the first instruction, followed by the second operand of the first store instruction, further followed by the second operand of the second store instruction.

At block 312, the processing device fuses the pair of instructions into a single fused store instruction with a descending storage order designation when at block 308 it is determined that the data to be stored is not in the ascending order. In one implementation, it is determined that the data is to be stored in the descending order when the first operand of the first store instruction corresponds to the second memory region and the second operand of the first store instruction specifies the first data to be stored in the second memory region, and when the first operand of the second store instruction corresponds to the first memory region and the second operand of the second store instruction specifies the second data to be stored in the first memory region.

Figure 4A:
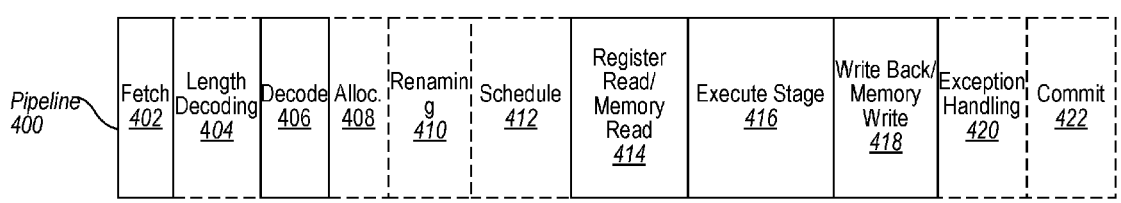
FIG. 4A is a block diagram illustrating a micro-architecture for a processor in which one implementation of the disclosure may be used.

FIG. 4A is a block diagram illustrating an in-order pipeline and a register renaming stage, out-of-order issue/execution pipeline implemented by processing device 400 according to some implementations of the disclosure. The solid lined boxes in FIG. 4A illustrate an in-order pipeline, while the dashed lined boxes illustrates a register renaming, out-of-order issue/execution pipeline. In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some implementations, the ordering of stages 402-424 may be different than illustrated and are not limited to the specific ordering shown in FIG. 4A.

Figure 4B:
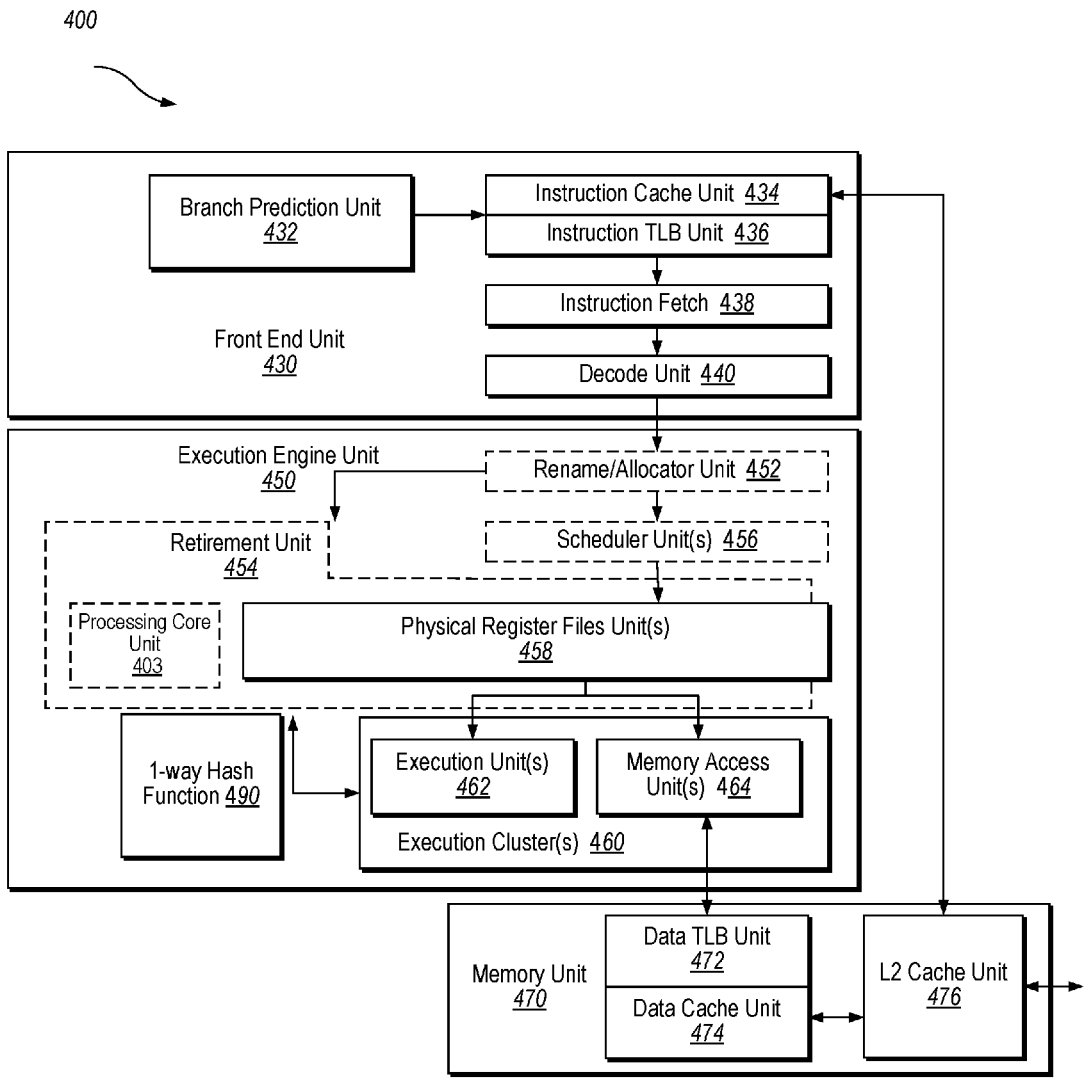
FIG. 4B is a block diagram illustrating an in-order pipeline and a register renaming stage, out-of-order issue/execution pipeline implemented according to at least one implementation of the disclosure.

FIG. 4B is a block diagram illustrating a micro-architecture for a processor 400 that implements the processing device including heterogeneous cores in accordance with one implementation of the disclosure. Specifically, processor 400 depicts an in-order architecture core and a register renaming logic, out-of-order issue/execution logic to be included in a processor according to at least one implementation of the disclosure.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one implementation, processor 400 may be a multi-core processor or may part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The retirement unit 454 may include a processing core unit 403 for processing devices according to implementations of the invention. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 400 may be the same as the processing device 100 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 560 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 456, physical register file(s) unit(s) 458, and execution cluster(s) 460 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some implementations DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary implementation, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one implementation, the data prefetcher 480 speculatively loads/prefetches data to the DCU 474 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 5:
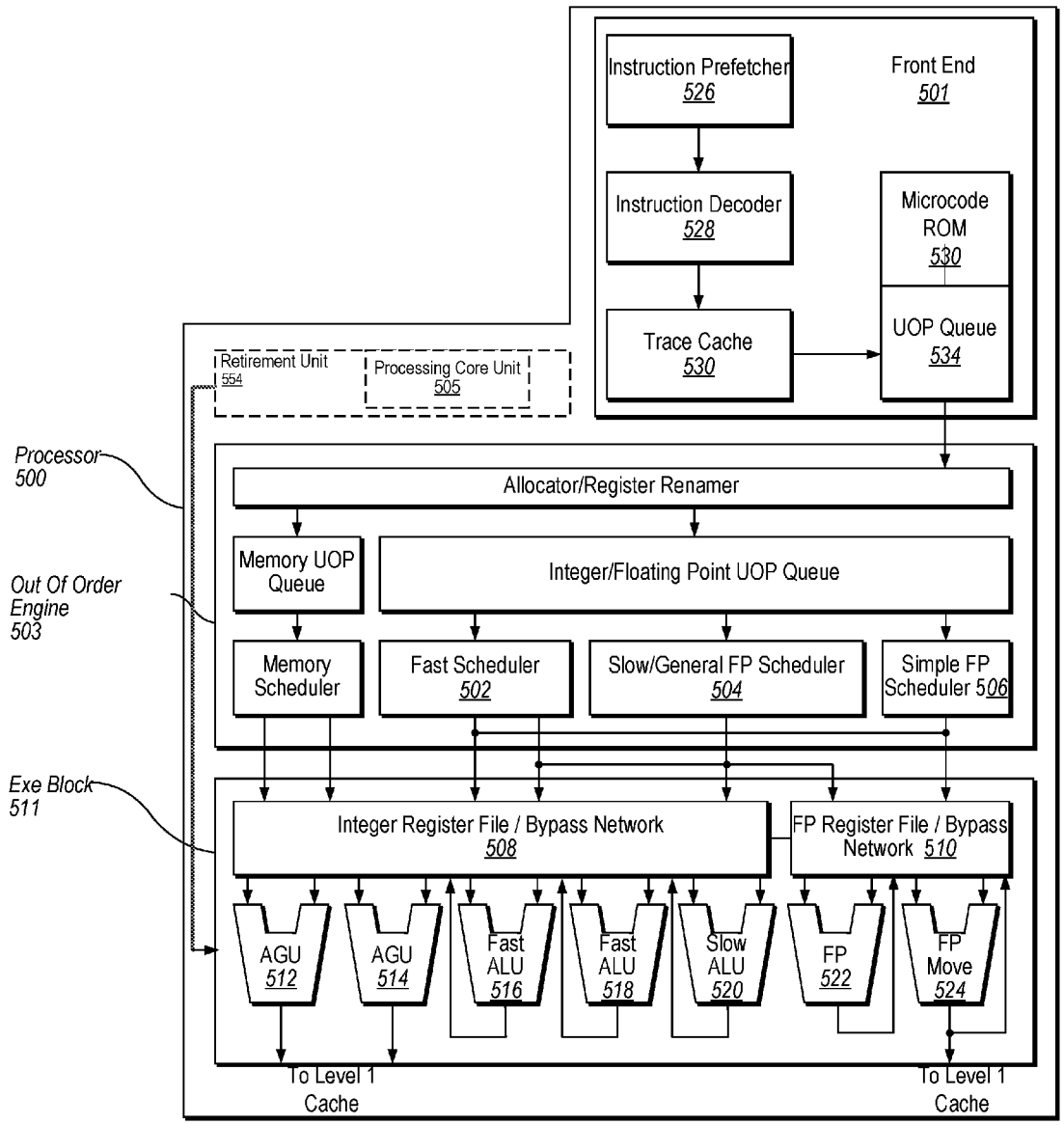
FIG. 5 illustrates a block diagram of the micro-architecture for a processor in accordance with one implementation of the disclosure.

FIG. 5 illustrates a block diagram of the micro-architecture for a processor 500 that includes hybrid cores in accordance with one implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 501 is the part of the processor 500 that fetches instructions to be executed and prepares them to be used later in the processor pipeline.

The front end 501 may include several units. In one implementation, the instruction prefetcher 526 fetches instructions from memory and feeds them to an instruction decoder 528 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one implementation, if more than four micro-ops are needed to complete an instruction, the decoder 528 accesses the microcode ROM 532 to do the instruction. For one implementation, an instruction can be decoded into a small number of micro ops for processing at the instruction decoder 528. In another implementation, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one implementation from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one implementation can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one implementation also includes a bypass network that can bypass or forward just completed results that have not yet been written into the register file to new dependent uops. The integer register file 508 and the floating point register file 510 are also capable of communicating data with the other. For one implementation, the integer register file 508 is split into two separate register files, one register file for the low order 32 bits of data and a second register file for the high order 32 bits of data. The floating point register file 510 of one implementation has 128 bit wide entries because floating point instructions typically have operands from 54 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one implementation is comprised of a number of execution units: address generation unit (AGU) 512, AGU 514, fast ALU 516, fast ALU 518, slow ALU 520, floating point ALU 522, floating point move unit 524. For one implementation, the floating point execution blocks 522, 524, execute floating point, MMX, SIMD, and SSE, or other operations. The floating point ALU 522 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 516, 518. The fast ALUs 516, 518, of one implementation can execute fast operations with an effective latency of half a clock cycle. For one implementation, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one implementation, the integer ALUs 516, 518, 520, are described in the context of performing integer operations on 64 bit data operands. In alternative implementations, the ALUs 516, 518, 520, can be implemented to support a variety of data bits including 16, 32, 128, 256, etc. Similarly, the floating point units 522, 524, can be implemented to support a range of operands having bits of various widths. For one implementation, the floating point units 522, 524, can operate on 128 bits wide packed data operands in conjunction with SIMD and multimedia instructions.

In one implementation, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The processor 500 also includes logic to implement store address prediction for memory disambiguation according to implementations of the disclosure. In one implementation, the execution block 511 of processor 500 may include a store address predictor (not shown) for implementing store address prediction for memory disambiguation.

The processor 500 may include a retirement unit 554 coupled to the execution block 511. The retirement unit 554 may include may include a processing core unit 505 for processing devices according to implementations of the disclosure.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 6:
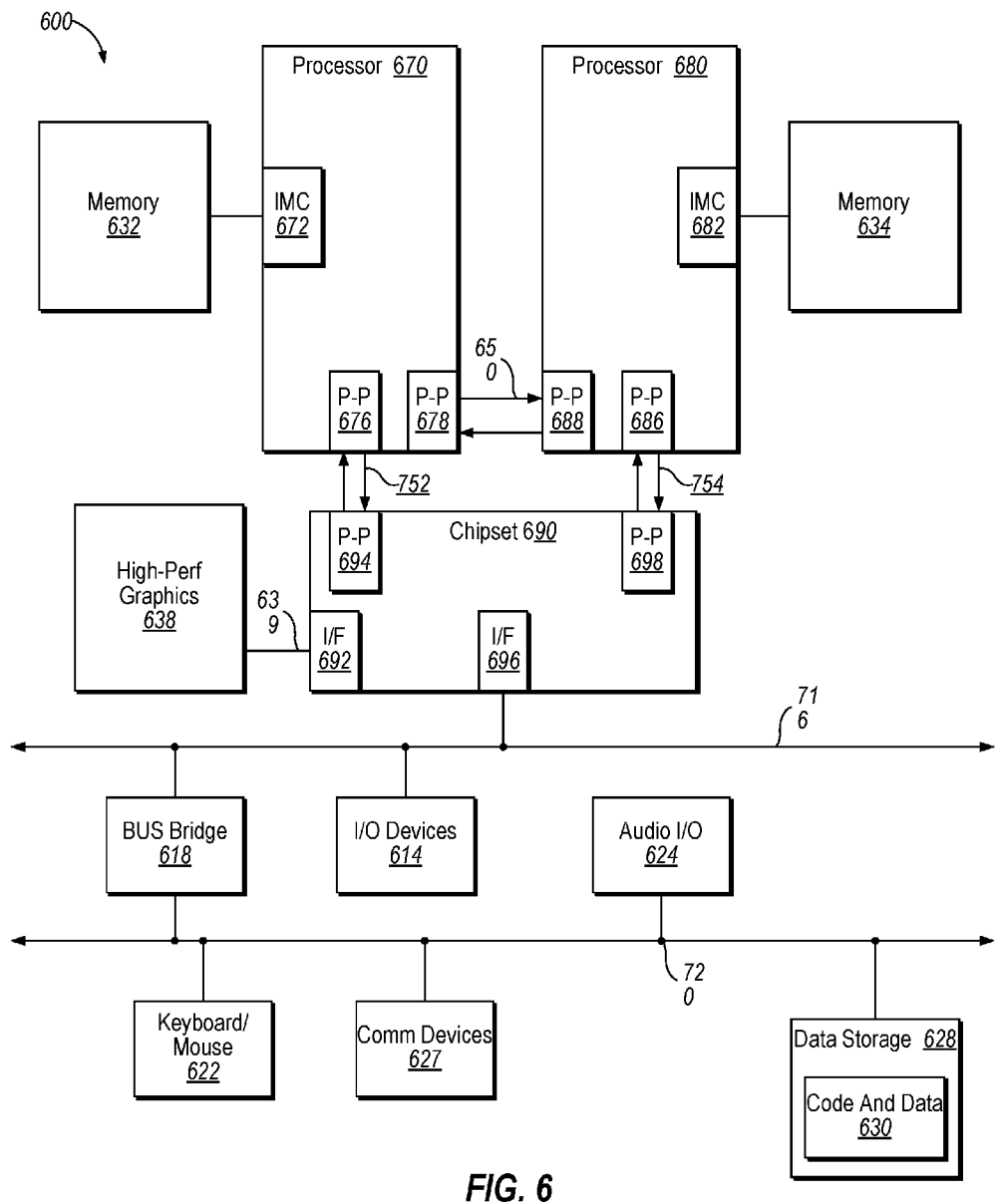
FIG. 6 is a block diagram illustrating a system in which an implementation of the disclosure may be used.

Referring now to FIG. 6, shown is a block diagram illustrating a system 600 in which an implementation of the disclosure may be used. As shown in FIG. 6, multiprocessor system 600 is a point-to-point interconnect system, and includes a first processor 670 and a second processor 680 coupled via a point-to-point interconnect 650. While shown with only two processors 670, 680, it is to be understood that the scope of implementations of the disclosure is not so limited. In other implementations, one or more additional processors may be present in a given processor. In one implementation, the multiprocessor system 600 may implement hybrid cores as described herein.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 790 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one implementation, first bus 616 may be a Peripheral Component Interconnect (PCI) bus, or a bus such as a PCI Express bus or another third generation I/O interconnect bus, although the scope of the disclosure is not so limited.

As shown in FIG. 6, various I/O devices 614 may be coupled to first bus 616, along with a bus bridge 618 which couples first bus 616 to a second bus 620. In one implementation, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one implementation. Further, an audio I/O 624 may be coupled to second bus 620. Note that other architectures are possible. For example, instead of the point-to-point architecture of FIG. 6, a system may implement a multi-drop bus or other such architecture.

Figure 7:
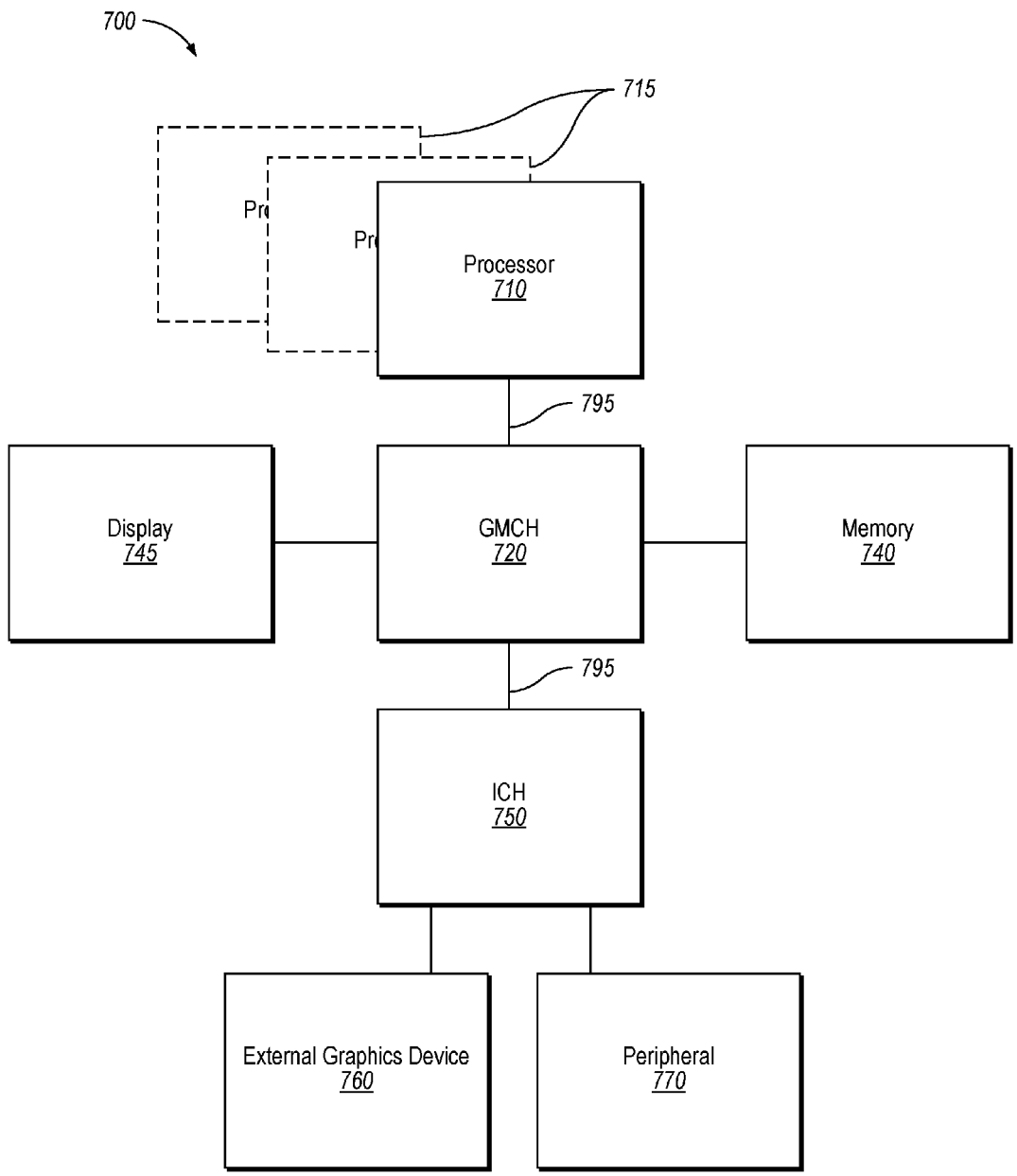
FIG. 7 is a block diagram of a system in which an implementation of the disclosure may operate.

Referring now to FIG. 7, shown is a block diagram of a system 700 in which one implementation of the disclosure may operate. The system 700 may include one or more processors 710, 715, which are coupled to graphics memory controller hub (GMCH) 720. The optional nature of additional processors 715 is denoted in FIG. 7 with broken lines. In one implementation, processors 710, 715 implement hybrid cores according to implementations of the disclosure.

Each processor 710, 715 may be some version of the circuit, integrated circuit, processor, and/or silicon integrated circuit as described above. However, it should be noted that it is unlikely that integrated graphics logic and integrated memory control units would exist in the processors 710, 715. FIG. 7 illustrates that the GMCH 720 may be coupled to a memory 740 that may be, for example, a dynamic random access memory (DRAM). The DRAM may, for at least one implementation, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one implementation, the GMCH 720 communicates with the processor(s) 710, 715 via a multi-drop bus, such as a frontside bus (FSB) 795.

Furthermore, GMCH 720 is coupled to a display 745 (such as a flat panel or touchscreen display). GMCH 720 may include an integrated graphics accelerator. GMCH 720 is further coupled to an input/output (I/O) controller hub (ICH) 750, which may be used to couple various peripheral devices to system 700. Shown for example in the implementation of FIG. 7 is an external graphics device 760, which may be a discrete graphics device, coupled to ICH 750, along with another peripheral device 770.

Alternatively, additional or different processors may also be present in the system 700. For example, additional processor(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processor. There can be a variety of differences between the processor(s) 710, 715 in terms of a spectrum of metrics of merit including architectural, micro-architectural, thermal, power consumption characteristics, and the like. These differences may effectively manifest themselves as asymmetry and heterogeneity amongst the processors 710, 715. For at least one implementation, the various processors 710, 715 may reside in the same die package.

Figure 8:
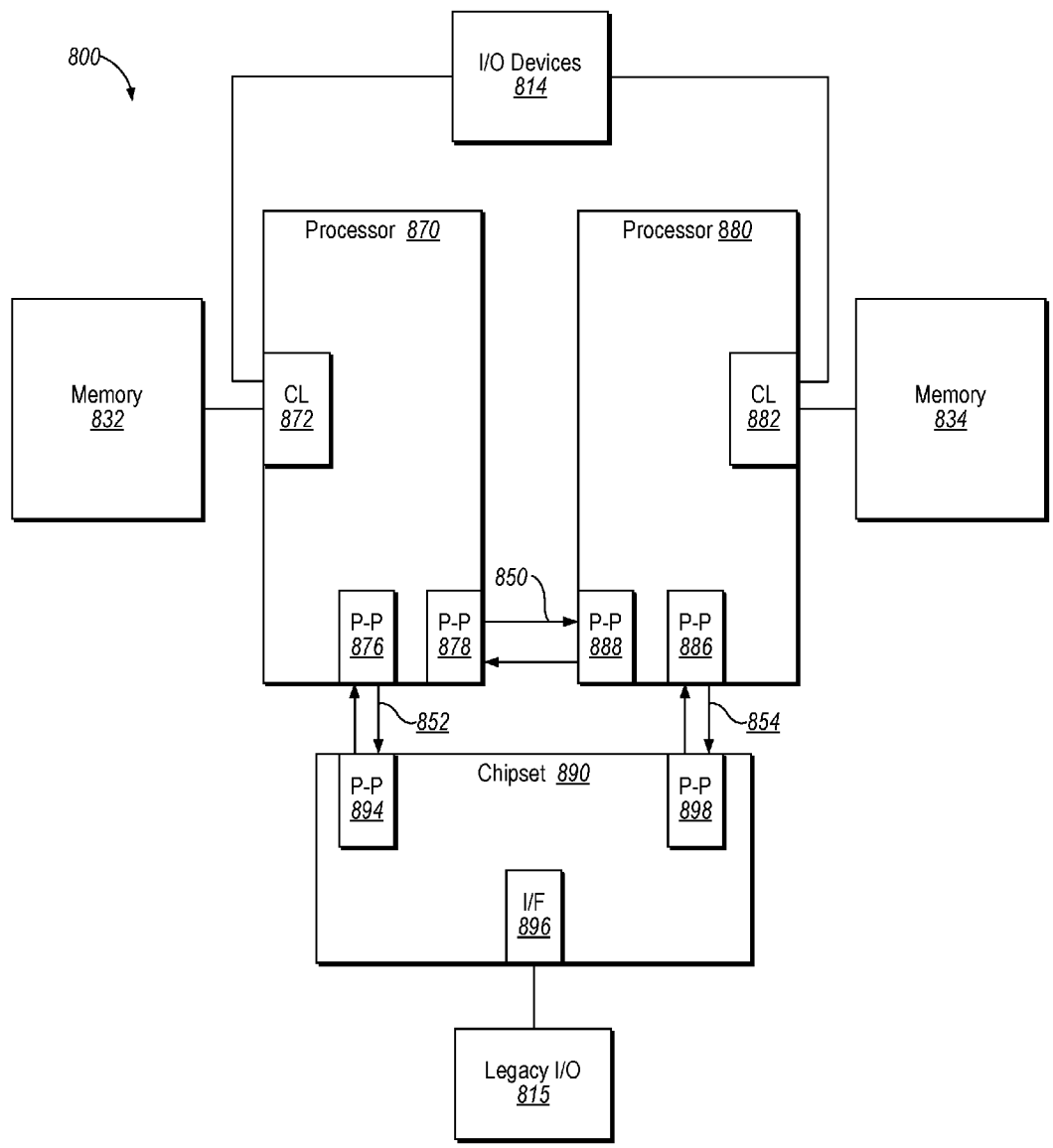
FIG. 8 is a block diagram of a system in which an implementation of the disclosure may operate.

Referring now to FIG. 8, shown is a block diagram of a system 800 in which an implementation of the disclosure may operate. FIG. 8 illustrates processors 870, 880. In one implementation, processors 870, 880 may implement hybrid cores as described above. Processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one implementation, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
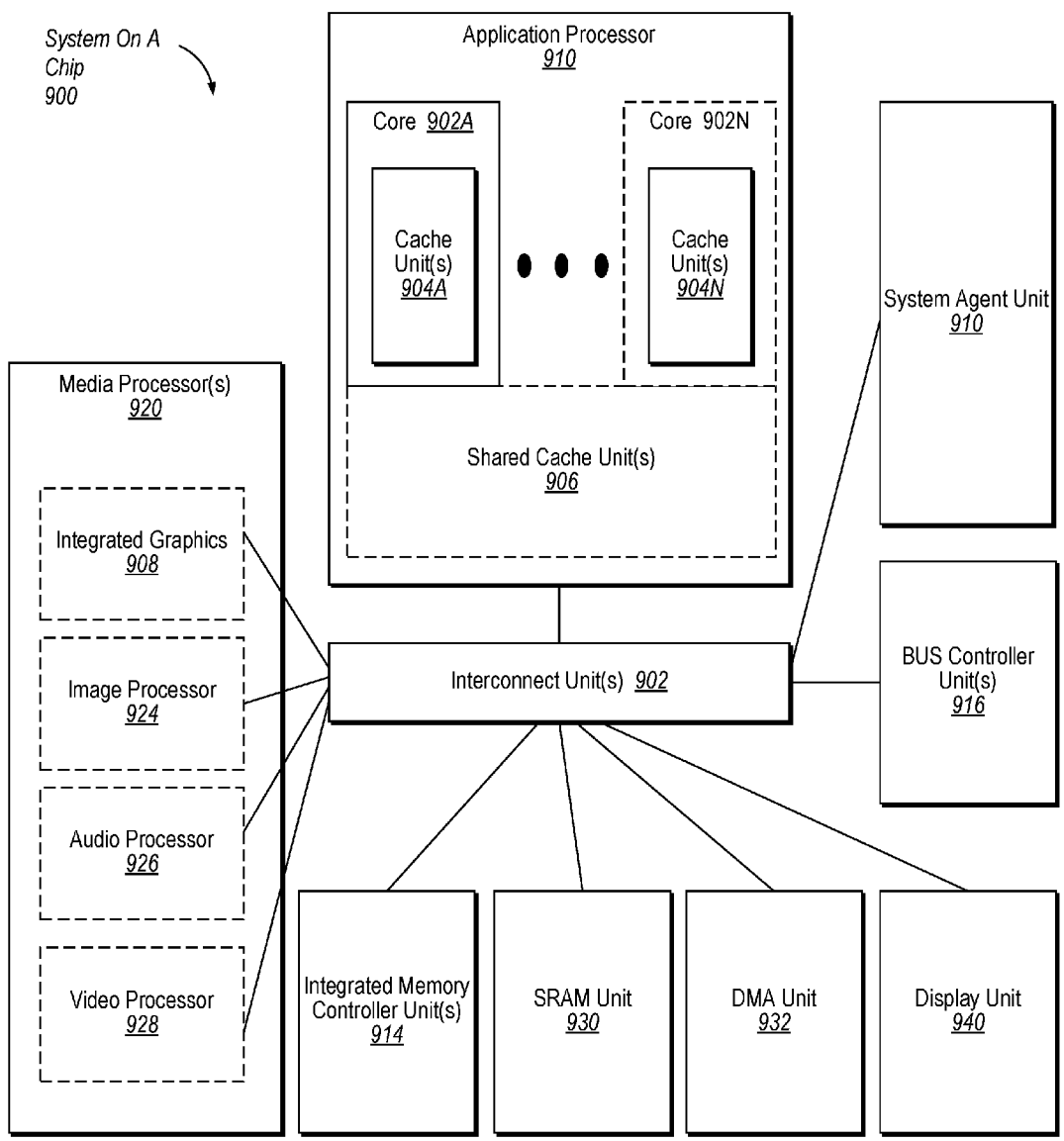
FIG. 9 is a block diagram of a System-on-a-Chip (SoC) in accordance with an implementation of the disclosure.

Implementations may be implemented in many different system types. FIG. 9 is a block diagram of a SoC 900 in accordance with an implementation of the disclosure. Dashed lined boxes are optional features on more advanced SoCs. In FIG. 9, an interconnect unit(s) 912 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one implementation, a memory module may be included in the integrated memory controller unit(s) 914. In another implementation, the memory module may be included in one or more other components of the SoC 900 that may be used to access and/or control a memory. The application processor 920 may include a store address predictor for implementing hybrid cores as described in implementations herein.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some implementations, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 920 may be from another company, such as ARM Holdings™, Ltd, MIPS™, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
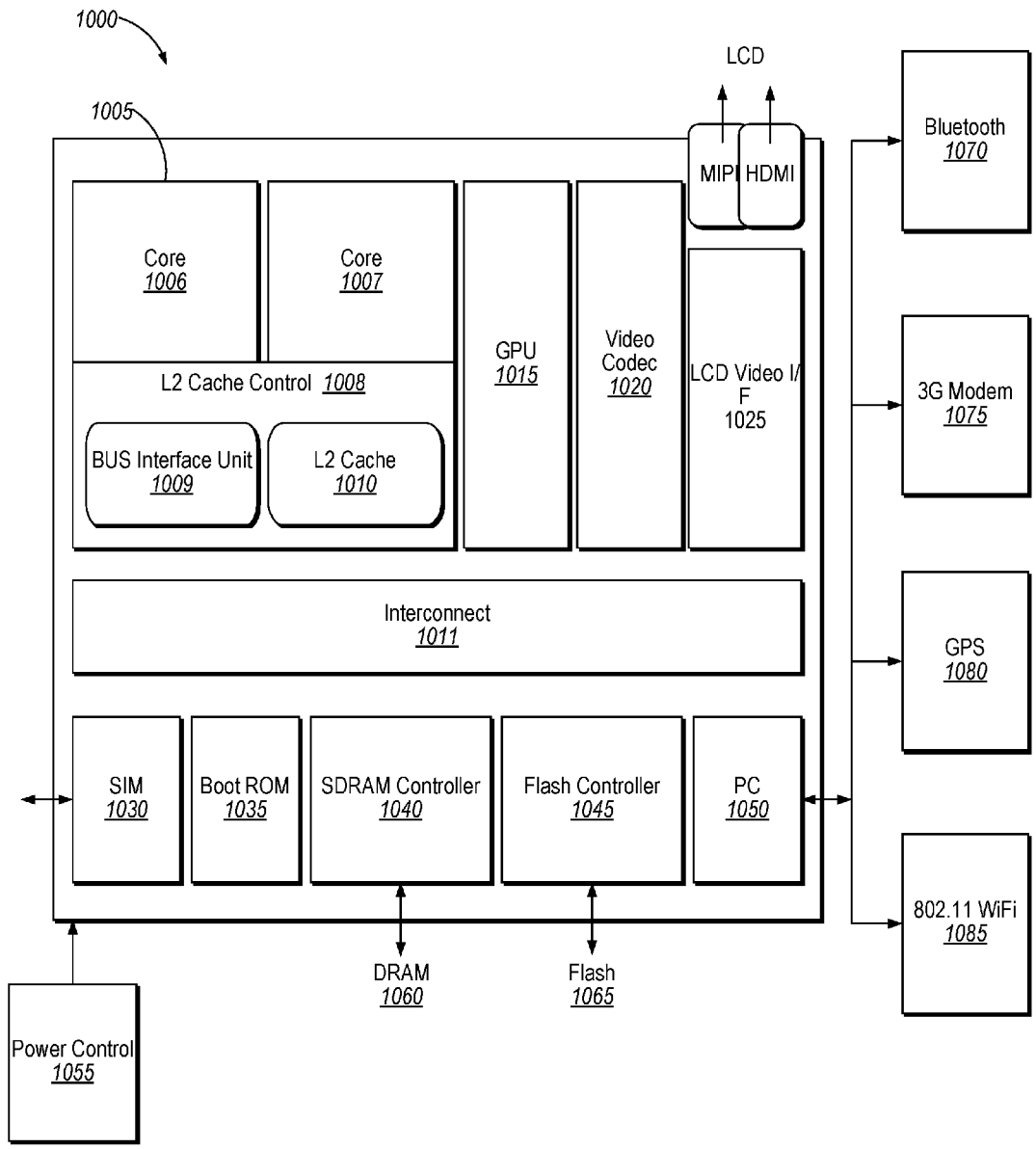
FIG. 10 is a block diagram of an implementation of an SoC design in accordance with the disclosure.

FIG. 10 is a block diagram of an implementation of a system on-chip (SoC) design in accordance with the disclosure. As a specific illustrative example, SoC 1000 is included in user equipment (UE). In one implementation, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1010 includes an on-chip interconnect, such as an IOSF, AMBA, or other interconnect discussed above, which potentially implements one or more aspects of the described disclosure. In one implementation, cores 1006, 1007 may implement hybrid cores as described in implementations herein.

Interconnect 1010 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein. In addition, the system 1000 illustrates peripherals for communication, such as a Bluetooth module 1070, 3G modem 1075, GPS 1080, and Wi-Fi 1085.

Figure 11:
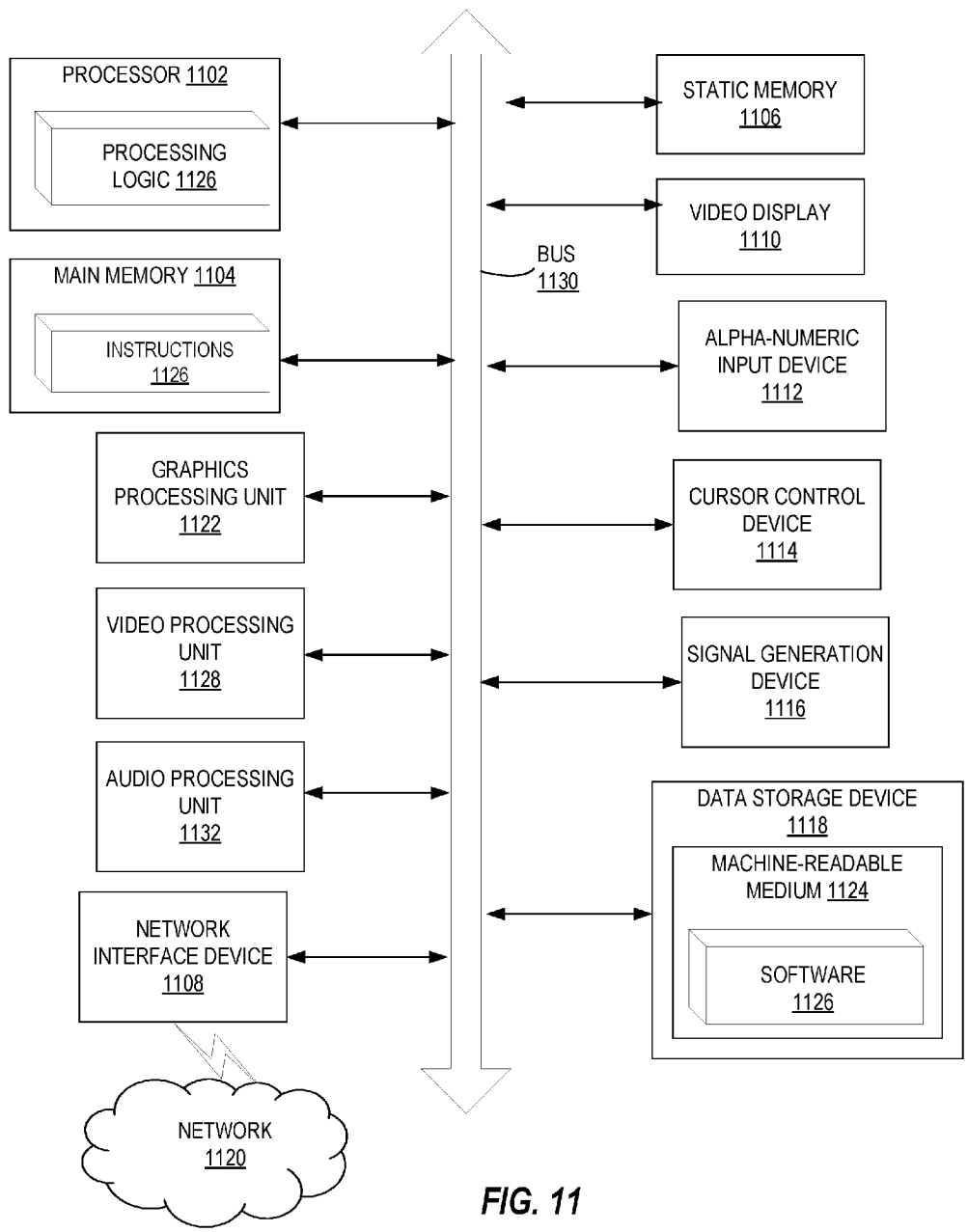
FIG. 11 illustrates a block diagram of one implementation of a computer system.

FIG. 11 illustrates a diagrammatic representation of a machine in the example form of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102, a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one implementation, processing device 1102 may include one or processing cores. The processing device 1102 is configured to execute the processing logic 1126 for performing the operations and steps discussed herein. In one implementation, processing device 1102 is the same as processor architecture 100 described with respect to FIG. 1 as described herein with implementations of the disclosure.

The computer system 1100 may further include a network interface device 1108 communicably coupled to a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker). Furthermore, computer system 1100 may include a graphics processing unit 1122, a video processing unit 1128, and an audio processing unit 1132.

The data storage device 1118 may include a machine-accessible storage medium 1124 on which is stored software 1126 implementing any one or more of the methodologies of functions described herein, such as implementing store address prediction for memory disambiguation as described above. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1126 implementing store address prediction for hybrid cores such as described according to implementations of the disclosure. While the machine-accessible storage medium 1118 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further implementations.

Example 1 is a processing device comprising a store instruction identification unit to identify a pair of store instructions among a plurality of instructions in an instruction queue, the pair of store instructions comprising a first store instruction and a second store instruction, wherein a first data of the first store instruction corresponds to a first memory region adjacent to a second memory region, and wherein a second data of the second store instruction corresponds to the second memory region; and a store instruction fusion unit to fuse the first store instruction with the second store instruction resulting in a fused store instruction.

In Example 2, the subject matter of Example 1 can optionally include a store instruction execution unit to execute the fused store instruction to cause the first and the second data to be stored in the first and the second memory regions.

In Example 3, the subject matter of Examples 1-2 can optionally include wherein the first store instruction occurs prior to the second store instruction, wherein the first memory region is located prior to the second memory region such that the first data or the second data is stored in the first memory region prior to being stored in the second memory region.

In Example 4, the subject matter of Examples 1-3 can optionally include wherein the first store instruction comprises two operands comprising a first operand specifying one of the first memory region or the second memory region; and a second operand specifying the first data to be stored in the one of the first memory region or the second memory region that is specified by the first operand.

In Example 5, the subject matter of Examples 1-4 can optionally include wherein the second instruction comprises two operands comprising a third operand specifying other of the one of the first memory region or the second memory region, wherein the other of the one of the first memory region or the second memory region is different from the one of the first memory region or the second memory region; and a fourth operand specifying the second data to be stored in the other of the one of first memory region or the second memory region.

In Example 6, the subject matter of Examples 1-5 can optionally include wherein the store instruction fusion unit to determine whether the first data and the second data is to be stored in one of an ascending storage order or a descending storage order based on the first operand and the second operand of the first instruction and the third operand and the fourth operand of the second instruction.

In Example 7, the subject matter of Examples 1-6 can optionally include wherein the store instruction fusion unit to determine that first data and the second data is to be stored in the ascending storage order in response to determining that the first operand of the first store instruction specifies the first memory region, the second operand of the first store instruction specifies the first data to be stored in the first memory region, the third operand of the second store instruction to specify the second memory region and the fourth operand of the second store instruction specifies the second data to be stored in the second memory region.

In Example 8, the subject matter of Examples 1-7 can optionally include wherein the store instruction fusion unit to determine that first data and the second data is to be stored in the descending storage order in response to determining that the first operand of the first store instruction specifies the second memory region, the second operand of the first store instruction specifies the first data to be stored in the second memory region, the third operand of the second store instruction to specify the first memory region and the fourth operand of the second store instruction specifies the second data to be stored in the first memory region; and mark the fused store instruction with a descending storage order designator.

In Example 9, the subject matter of Examples 1-8 can optionally include wherein the store instruction fusion unit to mark the fused store instruction with a descending storage order designator.

In Example 10, the subject matter of Examples 1-9 can optionally include wherein the fused store instruction comprises a first operand of the first store instruction, followed by the second operand of the first store instruction, followed by the fourth operand of the second store instruction.

Example 11 is a system-on-a chip (SoC) comprising a memory and a processing device communicably coupled to the memory, wherein the processing device comprises a store instruction identification unit to detect a pair of store instructions among a plurality of instructions in an instruction queue, the pair of store instructions comprising a first store instruction and a second store instruction, wherein a first data of the first store instruction corresponds to a first memory region adjacent to a second memory region, and wherein a second data of the second store instruction corresponds to the second memory region; and a store instruction fusion unit to merge the first store instruction with the second store instruction resulting in a fused store instruction.

In Example 12, the subject matter of Example 11 can optionally include wherein the first store instruction occurs prior to the second store instruction, wherein the first memory region is located prior to the second memory region such that the first data or the second data is stored in the first memory region prior to being stored in the second memory region.

In Example 13, the subject matter of Examples 11-12 can optionally include wherein the first store instruction comprises two operands comprising a first operand specifying one of the first memory region or the second memory region and a second operand specifying the first data to be stored in the one of the first memory region or the second memory region that is specified by the first operand, wherein the second instruction comprises two operands comprising a third operand specifying other of the one of the first memory region or the second memory region, and a fourth operand specifying the second data to be stored in the other of the one of first memory region or the second memory region, wherein the other of the first memory region or the second memory region is different from the one of the first memory region or the second memory region.

In Example 14, the subject matter of Examples 11-13 can optionally include wherein the store instruction fusion unit to determine that first data and the second data is to be stored in an ascending storage order in response to determining that the first operand of the first store instruction specifies the first memory region, the second operand of the first store instruction specifies the first data to be stored in the first memory region, the third operand of the second store instruction to specify the second memory region and the fourth operand of the second store instruction specifies the second data to be stored in the second memory region.

In Example 15, the subject matter of Examples 11-14 can optionally include wherein the store instruction fusion unit to determine that first data and the second data is to be stored in a descending storage order in response to determining that the first operand of the first store instruction specifies the second memory region, the second operand of the first store instruction specifies the first data to be stored in the second memory region, the third operand of the second store instruction to specify the first memory region and the fourth operand of the second store instruction specifies the second data to be stored in the first memory region; and mark the fused store instruction with a descending storage order designator.

Example 16 is a method comprising identifying a pair of store instructions among a plurality of instructions in an instruction queue, wherein the pair of store instructions comprise a first store instruction and a second store instruction, wherein a first data of the first store instruction corresponds to a first memory region adjacent to a second memory region and wherein a second data of the second store instruction corresponds to the second memory region; and fusing the first store instruction with the second store instruction resulting in a fused store instruction.

In Example 17, the subject matter of Example 16 can optionally include wherein the first store instruction occurs prior to the second store instruction, wherein the first memory region is located prior to the second memory region such that the first data or the second data is stored in the first memory region prior to being stored in the second memory region.

In Example 18, the subject matter of Examples 16-17 can optionally include wherein the first store instruction comprises two operands comprising a first operand specifying one of the first memory region or the second memory region and a second operand specifying the first data to be stored in the one of the first memory region or the second memory region that is specified by the first operand, wherein the second instruction comprises two operands comprising a third operand specifying other of the one of the first memory region or the second memory region, and a fourth operand specifying the second data to be stored in the other of the one of first memory region or the second memory region, wherein the other of the first memory region or the second memory region is different from the one of the first memory region or the second memory region.

In Example 19, the subject matter of Examples 16-18 can optionally include determining that first data and the second data is to be stored in an ascending storage order in response to determining that the first operand of the first store instruction specifies the first memory region, the second operand of the first store instruction specifies the first data to be stored in the first memory region, the third operand of the second store instruction to specify the second memory region and the fourth operand of the second store instruction specifies the second data to be stored in the second memory region.

In Example 20, the subject matter of Examples 16-19 can optionally include determining that first data and the second data is to be stored in a descending storage order in response to determining that the first operand of the first store instruction specifies the second memory region, the second operand of the first store instruction specifies the first data to be stored in the second memory region, the third operand of the second store instruction to specify the first memory region and the fourth operand of the second store instruction specifies the second data to be stored in the first memory region; and marking the fused store instruction with a descending storage order designator.

Example 21 is a non-transitory machine-readable storage medium including instructions that, when accessed by a processing device, cause the processing device to perform operations comprising detecting a pair of store instructions among a plurality of instructions in an instruction queue, wherein the pair of store instructions comprise a first store instruction and a second store instruction, wherein a first data of the first store instruction corresponds to a first memory region adjacent to a second memory region and wherein a second data of the second store instruction corresponds to the second memory region; and merging the first store instruction with the second store instruction resulting in a fused store instruction.

In Example 22, the subject matter of Example 21 can optionally include wherein the first store instruction occurs prior to the second store instruction, wherein the first memory region is located prior to the second memory region such that the first data or the second data is stored in the first memory region prior to being stored in the second memory region.

In Example 23, the subject matter of Examples 21-22 can optionally include wherein the first store instruction comprises two operands comprising a first operand specifying one of the first memory region or the second memory region and a second operand specifying the first data to be stored in the one of the first memory region or the second memory region that is specified by the first operand, wherein the second instruction comprises two operands comprising a third operand specifying other of the one of the first memory region or the second memory region, and a fourth operand specifying the second data to be stored in the other of the one of first memory region or the second memory region, wherein the other of the first memory region or the second memory region is different from the one of the first memory region or the second memory region.

In Example 24, the subject matter of Examples 21-23 can optionally include wherein the operations further comprising determining that first data and the second data is to be stored in an ascending storage order in response to determining that the first operand of the first store instruction specifies the first memory region, the second operand of the first store instruction specifies the first data to be stored in the first memory region, the third operand of the second store instruction to specify the second memory region and the fourth operand of the second store instruction specifies the second data to be stored in the second memory region.

In Example 25, the subject matter of Examples 21-24 can optionally include wherein the operations further comprising determining that first data and the second data is to be stored in a descending storage order in response to determining that the first operand of the first store instruction specifies the second memory region, the second operand of the first store instruction specifies the first data to be stored in the second memory region, the third operand of the second store instruction to specify the first memory region and the fourth operand of the second store instruction specifies the second data to be stored in the first memory region; and marking the fused store instruction with a descending storage order designator.

Various implementations may have different combinations of the structural features described above. For instance, all optional features of the SOC described above may also be implemented with respect to a processor described herein and specifics in the examples may be used anywhere in one or more implementations.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A processing device comprising:
  a store instruction identification unit to identify a pair of store instructions among a plurality of instructions in an instruction queue, the pair of store instructions comprising a first store instruction and a second store instruction, wherein a first data of the first store instruction corresponds to a first memory region of memory adjacent to a second memory region of the memory, and wherein a second data of the second store instruction corresponds to the second memory region; and
  a store instruction fusion unit to fuse, responsive to determining that the first store instruction and the second store instruction correspond to adjacent memory regions, the first store instruction with the second store instruction resulting in a fused store instruction, wherein the store instruction fusion unit to determine whether the first data and the second data is to be stored in one of an ascending storage order or a descending storage order based on a first operand and a second operand of the first instruction and a third operand and a fourth operand of the second instruction, wherein the first, second, third, and fourth operands are different than the first and second data.

2. The processing device of claim 1 further comprising:
a store instruction execution unit to execute the fused store instruction to cause the first and the second data to be stored in the first and the second memory regions.

3. The processing device of claim 1 wherein the first store instruction occurs prior to the second store instruction in the instruction queue, wherein the first memory region is located prior to the second memory region in the memory, and wherein storage of the first data or the second data is performed in the first memory region prior to storage in the second memory region.

4. The processing device of claim 3 wherein
the first operand specifies one of the first memory region or the second memory region, and
wherein the second operand specifies the first data to be stored in the one of the first memory region or the second memory region that is specified by the first operand.

5. The processing device of claim 4 wherein
the third operand specifies one of the first memory region or the second memory region that is not specified by the first operand, and
wherein the fourth operand specifies the second data to be stored in the memory region that is specified by the third operand.

6. The processing device of claim 5 wherein the fused store instruction comprises a first operand of the first store instruction, followed by the second operand of the first store instruction, followed by the fourth operand of the second store instruction.

7. The processing device of claim 4 wherein the store instruction fusion unit to determine that first data and the second data is to be stored in the ascending storage order in response to determining that the first operand of the first store instruction specifies the first memory region, the second operand of the first store instruction specifies the first data to be stored in the first memory region, the third operand of the second store instruction to specify the second memory region and the fourth operand of the second store instruction specifies the second data to be stored in the second memory region.

8. The processing device of claim 4 wherein the store instruction fusion unit to:
determine that first data and the second data is to be stored in the descending storage order in response to determining that the first operand of the first store instruction specifies the second memory region, the second operand of the first store instruction specifies the first data to be stored in the second memory region, the third operand of the second store instruction to specify the first memory region and the fourth operand of the second store instruction specifies the second data to be stored in the first memory region; and
mark the fused store instruction with a descending storage order designator.

9. The processing device of claim 8 wherein the store instruction fusion unit to mark the fused store instruction with a descending storage order designator.

10. A system-on-a chip (SoC) comprising:
a memory comprising a first memory region and a second memory region; and
a processing device communicably coupled to the memory, wherein the processing device comprises:
a store instruction identification unit to detect a pair of store instructions among a plurality of instructions in an instruction queue, the pair of store instructions comprising a first store instruction and a second store instruction, wherein a first data of the first store instruction corresponds to the first memory region adjacent to the second memory region, and wherein a second data of the second store instruction corresponds to the second memory region; and
a store instruction fusion unit to merge, responsive to determining that the first store instruction and the second store instruction correspond to adjacent memory regions, the first store instruction with the second store instruction resulting in a fused store instruction, wherein the store instruction fusion unit to determine whether the first data and the second data is to be stored in one of an ascending storage order or a descending storage order based on a first operand and a second operand of the first instruction and a third operand and a fourth operand of the second instruction, wherein the first, second, third, and fourth operands are different than the first and second data.

11. The SoC of claim 10 wherein the first store instruction occurs prior to the second store instruction in the instruction queue, wherein the first memory region is located prior to the second memory region in the memory, and wherein storage of the first data or the second data is performed in the first memory region prior to storage in the second memory region.

12. The SoC of claim 11 wherein
the first operand specifies one of the first memory region or the second memory region, and
wherein the second operand specifies the first data to be stored in the one of the first memory region or the second memory region that is specified by the first operand;
wherein
the third operand specifies one of the first memory region or the second memory region that is not specified by the first operand, and
wherein the fourth operand specifies the second data in the memory region that is specified by the third operand.

13. The SoC of claim 12 wherein the store instruction fusion unit to determine that first data and the second data is to be stored in the ascending storage order in response to determining that the first operand of the first store instruction specifies the first memory region, the second operand of the first store instruction specifies the first data to be stored in the first memory region, the third operand of the second store instruction to specify the second memory region and the fourth operand of the second store instruction specifies the second data to be stored in the second memory region.

14. The SoC of claim 12 wherein the store instruction fusion unit to:
determine that first data and the second data is to be stored in the descending storage order in response to determining that the first operand of the first store instruction specifies the second memory region, the second operand of the first store instruction specifies the first data to be stored in the second memory region, the third operand of the second store instruction to specify the first memory region and the fourth operand of the second store instruction specifies the second data to be stored in the first memory region; and
mark the fused store instruction with a descending storage order designator.

15. A method comprising:
identifying a pair of store instructions among a plurality of instructions in an instruction queue, wherein the pair of store instructions comprise a first store instruction and a second store instruction, wherein a first data of the first store instruction corresponds to a first memory region of a memory, the first memory region adjacent to a second memory region of the memory, and wherein a second data of the second store instruction corresponds to the second memory region;

responsive to determining that the first store instruction and the second store instruction correspond to adjacent memory regions, fusing the first store instruction with the second store instruction resulting in a fused store instruction; and determining whether the first data and the second data is to be stored in one of an ascending storage order or a descending storage order based on a first operand and a second operand of the first instruction and a third operand and a fourth operand of the second instruction, wherein the first, second, third, and fourth operands are different than the first and second data.

16. The method of claim 15 wherein the first store instruction occurs prior to the second store instruction in the instruction queue, wherein the first memory region is located prior to the second memory region in the memory, and wherein storage of the first data or the second data is performed in the first memory region prior to storage in the second memory region.

17. The method of claim 16 wherein
the first operand specifies one of the first memory region or the second memory region, and
wherein the second operand specifies the first data to be stored in the one of the first memory region or the second memory region that is specified by the first operand;
the third operand specifies one of the first memory region or the second memory region that is not specified by the first operand, and
wherein the fourth operand specifies the second data in the memory region that is specified by the third operand.

18. The method of claim 17 further comprising determining that first data and the second data is to be stored in the ascending storage order in response to determining that the first operand of the first store instruction specifies the first memory region, the second operand of the first store instruction specifies the first data to be stored in the first memory region, the third operand of the second store instruction to specify the second memory region and the fourth operand of the second store instruction specifies the second data to be stored in the second memory region.

19. The method of claim 17 further comprising:
determining that first data and the second data is to be stored in the descending storage order in response to determining that the first operand of the first store instruction specifies the second memory region, the second operand of the first store instruction specifies the first data to be stored in the second memory region, the third operand of the second store instruction to specify the first memory region and the fourth operand of the second store instruction specifies the second data to be stored in the first memory region; and
marking the fused store instruction with a descending storage order designator.

20. A non-transitory machine-readable storage medium including instructions that, when accessed by a processing device, cause the processing device to perform operations comprising:

detecting a pair of store instructions among a plurality of instructions in an instruction queue, wherein the pair of store instructions comprise a first store instruction and a second store instruction, wherein a first data of the first store instruction corresponds to a first memory region of a memory, the first memory region adjacent to a second memory region of the memory, and wherein a second data of the second store instruction corresponds to the second memory region;

responsive to determining that the first store instruction and the second store instruction correspond to adjacent memory regions, merging the first store instruction with the second store instruction resulting in a fused store instruction; and determining whether the first data and the second data is to be stored in one of an ascending storage order or a descending storage order based on a first operand and a second operand of the first instruction and a third operand and a fourth operand of the second instruction, wherein the first, second, third, and fourth operands are different than the first and second data.

21. The non-transitory machine-readable storage medium of claim 20 wherein the first store instruction occurs prior to the second store instruction in the instruction queue, wherein the first memory region is located prior to the second memory region in the memory, and wherein storage of the first data or the second data is performed in the first memory region prior to storage in the second memory region.

22. The non-transitory machine-readable storage medium of claim 21 wherein
the first operand specifies one of the first memory region or the second memory region, and
wherein the second operand specifies the first data to be stored in the one of the first memory region or the second memory region that is specified by the first operand;
wherein
the third operand specifies one of the first memory region or the second memory region that is not specified by the first operand, and
wherein the fourth operand specifies the second data in the memory region that is specified by the third operand.

23. The non-transitory machine-readable storage medium of claim 22 wherein the operations further comprising determining that first data and the second data is to be stored in the ascending storage order in response to determining that the first operand of the first store instruction specifies the first memory region, the second operand of the first store instruction specifies the first data to be stored in the first memory region, the third operand of the second store instruction to specify the second memory region and the fourth operand of the second store instruction specifies the second data to be stored in the second memory region.

24. The non-transitory machine-readable storage medium of claim 22 wherein the operations further comprising:
determining that first data and the second data is to be stored in the descending storage order in response to determining that the first operand of the first store instruction specifies the second memory region, the second operand of the first store instruction specifies the first data to be stored in the second memory region, the third operand of the second store instruction to specify the first memory region and the fourth operand of the second store instruction specifies the second data to be stored in the first memory region; and marking the fused store instruction with a descending storage order designator.

\* \* \* \* \*